United States Patent [19]

Chaki

[11] Patent Number: 5,602,669
[45] Date of Patent: Feb. 11, 1997

[54] DIGITAL SIGNAL TRANSMISSION APPARATUS, DIGITAL SIGNAL TRANSMISSION METHOD, AND DIGITAL SIGNAL TRANSMITTER-RECEIVER

[75] Inventor: Yasuyuki Chaki, Chiba, Japan

[73] Assignee: Sony Corporation, Tokyo, Japan

[21] Appl. No.: 494,883

[22] Filed: Jun. 26, 1995

[30] Foreign Application Priority Data

Jun. 30, 1994  [JP]  Japan ................................ 6-173589

[51] Int. Cl.⁶ ................................................ H04B 10/04
[52] U.S. Cl. ..................... 359/181; 359/183; 375/281; 375/298; 375/308; 371/30
[58] Field of Search ........................ 359/142, 154, 359/172, 181, 183; 375/281, 298, 308, 329; 455/151.2; 332/103; 371/30

[56] References Cited

U.S. PATENT DOCUMENTS

| | | | |
|---|---|---|---|
| 3,953,727 | 4/1976 | d'Auria et al. | 250/199 |
| 4,682,352 | 7/1987 | Durham | 379/98 |
| 4,737,968 | 4/1988 | Norton et al. | 332/103 |
| 4,809,257 | 2/1989 | Gantenbein et al. | 370/4 |
| 4,959,874 | 9/1990 | Saruta et al. | 455/601 |
| 4,975,926 | 12/1990 | Knapp | 375/1 |
| 4,977,618 | 12/1990 | Allen | 455/607 |
| 5,046,187 | 9/1991 | Takahashi | 379/93 |
| 5,075,792 | 12/1991 | Brown et al. | 359/152 |
| 5,077,552 | 12/1991 | Abbate | 340/825 |
| 5,081,711 | 1/1992 | Rickman, Jr. | 359/146 |
| 5,189,543 | 2/1993 | Lin et al. | 359/142 |
| 5,239,295 | 8/1993 | DeLuca et al. | 340/825 |
| 5,394,259 | 2/1995 | Takahara | 359/142 |
| 5,483,367 | 1/1996 | Han | 359/182 |

FOREIGN PATENT DOCUMENTS

| | | | |
|---|---|---|---|
| 0249205 | 12/1987 | European Pat. Off. | H04M 11/06 |
| 3922-041-A | 1/1991 | Germany | H03J 9/00 |
| 1-260938 | 10/1989 | Japan | H04B 9/00 |
| 2234377 | 1/1991 | United Kingdom | G08C 23/00 |

OTHER PUBLICATIONS

"Cursor Controller/Graphics Pad", IBM Technical Disclosure Bulletin, vol. 28, No. 9, Feb. 1986, pp. 4093–4097.

*Primary Examiner*—Kinfe-Michael Negash
*Attorney, Agent, or Firm*—Limbach & Limbach L.L.P.

[57] ABSTRACT

A digital signal transmitting apparatus, a digital signal transmitting method, and a digital signal transmitter-receiver, for transmitting a digital signal within a specified frequency band by using an infrared transmission method. An infrared signal within a specified frequency band can be obtained by using a QPSK modulation circuit 13 having roll-off filters 132 and 133 and applying roll-off filtering and QPSK modulation to an inputted digital audio signal, and thereby generating a digital modulated signal S2 whose bandwidth is narrowed and driving an infrared emitter based on the modulated digital audio signal S2.

29 Claims, 11 Drawing Sheets

DIGITAL SIGNAL TRANSMISSION APPARATUS, DIGITAL SIGNAL TRANSMISSION METHOD, AND DIGITAL SIGNAL TRANSMITTER-RECEIVER

BACKGROUND OF THE INVENTION

1. Field of the Invention

The present invention relates to a digital signal transmission apparatus, a digital signal transmission method, and a digital signal transmitter-receiver, and is suitable for applying to a case of transmitting a digital audio signal by, for example, a radio transmission system.

2. Description of the Related Art

As this type of audio signal transmission method, there is an infrared transmission method. The infrared transmission method generates a transmission audio signal by frequency-modulating an audio signal at the transmitting side and driving an infrared optical emitter based on the frequency-modulated signal. At the receiving side, the transmission audio signal is received by an infrared photodetector and thereafter demodulated.

Thereby, this type of audio signal transmission method requires no transmission line and makes it possible to simultaneously transmit a desired audio signal to a plurality of audio units. Therefore, the audio signal transmission method is used for a wireless headphone, a speaker system, and so on.

However, the existing infrared transmission method has a problem that an audio signal is easily deteriorated because it is analog-modulated and then transmitted.

To solve this problem, an audio signal transmission method of driving an infrared optical emitter based on a digital audio signal and thereby transmitting a high-tone-quality digital audio signal by an infrared transmission method is proposed by the applicant of this application and disclosed in the U.S. Pat. No. 5,394,259.

However, the audio signal transmission method of this type drives an infrared optical emitter by directly using a digital audio signal to be originally transmitted by a coaxial cable or optical fiber, or a digital audio signal processed through EFM (Eight to Fourteen Modulation). Therefore, a problem occurs that the frequency band of the digital audio signal thus obtained cannot follow the frequency allocation of sub-carriers related to infrared transmission specified in CP-1205 of Electronic Industries Association of Japan.

That is, CP-1205 specifies the frequency allocation (sub-carrier) shown in FIG. 1 so as to transmit a remote control signal within a band of 0.33 to 0.4 MHz, a conference system signal and an analog audio signal within a band of 0.4 to 1 MHz, various data values within a band of 1 to 2 MHz, a high-tone-quality audio signal within a band of 2 to 6 MHz, and a video signal within a band of 6 to 30 MHz.

Thus, a digital audio signal must be transmitted within a frequency band of 2 to 6 MHz. However, an existing digital audio signal is transmitted also by using a band other than the above frequency band.

SUMMARY OF THE INVENTION

In view of the foregoing, an object of the present invention is to provide a digital signal transmission apparatus, a digital signal transmission method, and a digital signal transmitter-receiver where it is possible to transmit within a specified frequency band and to obtain a desired signal characteristic at the receiving side, when transmitting a digital audio signal according to the infrared transmission method.

The foregoing object and other objects of the present invention have been achieved by the present invention, which provides QPSK-modulation means comprising: a means for generating an I-component signal and a Q-component signal through serial/parallel conversion of a digital signal; a roll-off filter with a predetermined roll-off rate for narrowing a bandwidth through filtering of the I- and Q-component signals; and a means for two-phase-modulating the filtered I- and Q-component signals, so that an infrared emitter is driven based on a digital modulated signal supplied from the QPSK-modulation means to generate infrared rays.

Further, the present invention provides: data division means for dividing a digital signal into a plurality of data values in accordance with a predetermined significance of each data value included in the digital signal; QPSK-modulation means for roll-off-shaping and QPSK-modulating one of the divided data values; BPSK-modulation means for roll-off-shaping and BPSK-modulating one of the divided data values; 16QAM-modulation means for roll-off-shaping and 16QAM-modulating one of the divided data values; and addition means for adding BPSK-modulated data, 16QAM-modulated data, and QPSK-modulated data, so that an infrared emitter is driven based on a digital modulated signal supplied from the addition means to generate infrared rays.

A digital signal is modulated by the QPSK-modulation means having a roll-off filter and limited to a predetermined frequency band. Therefore, an infrared signal set within a specified frequency band can be obtained by driving an infrared emitter based on the band-limited digital modulated signal.

Moreover, by applying a different modulation (QPSK modulation, 16QAM modulation, or BPSK modulation) to a digital signal in accordance with the significance of the digital signal data, it is possible to increase the transmission distance for data with higher significance and receive a natural voice whose tone quality is gradually deteriorated at the receiving side as the distance between the transmitting and receiving sides increases. As a result, it is possible to obtain a desired signal characteristic at the receiving side.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figure 1:
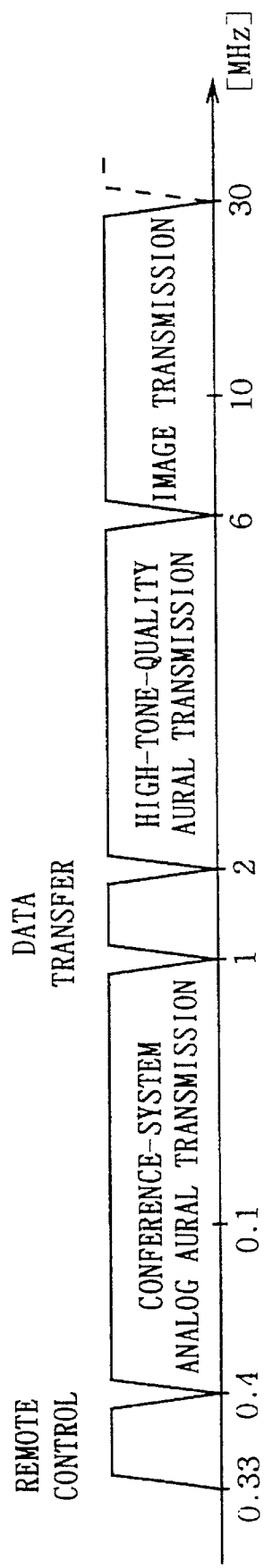
FIG. 1 is a schematic diagram showing a frequency allocation standard related to infrared transmission.
Figure 2:
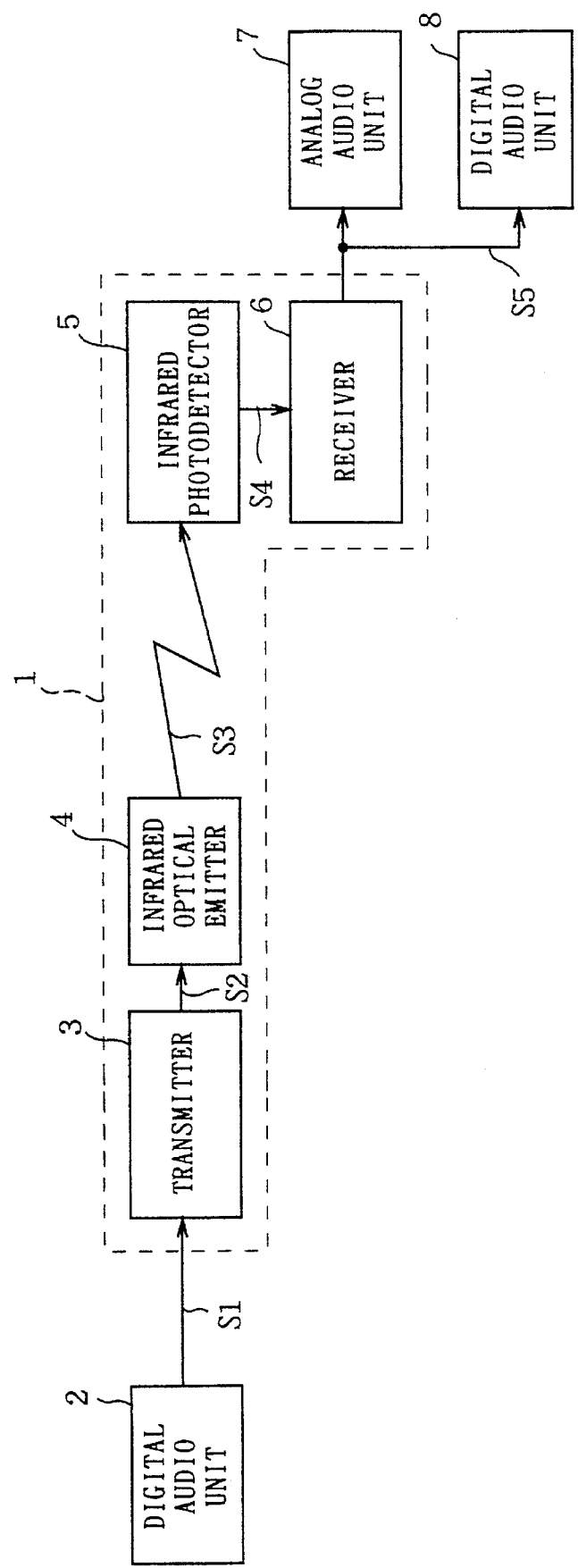
FIG. 2 is a block diagram showing an embodiment of an audio signal transmission system using the digital signal transmission apparatus of the present invention.

Referring to FIG. 2, reference numeral 1 denotes an audio signal transmission apparatus for transmitting a digital audio signal according to the infrared transmission method as a whole. The audio signal transmission apparatus 1 inputs a digital audio signal S1 outputted from a digital audio unit 2 to a transmitter 3 through a coaxial cable or optical fiber.

In the transmitter 3, the digital audio signal S1 conforming to IEC-958 (DIO) specified by IEC (International Electrotechnical Commission) is first re-formatted into a structure suitable for infrared transmission. This is because data at a transmission rate of 3.072 Mpbs×2 (multiplied by 2 for biphase conversion) is present in the case of DIO and thereby a band cannot be set within 3 to 6 MHz.

The re-formatted signal is digital-modulated and a modulated audio signal S2 obtained by the digital modulation is transmitted to an infrared optical emitter 4. The infrared optical emitter 4 comprises an amplifying circuit, a light emitting diode (or a laser diode), a lens, and an optical filter, which is driven based on the modulated audio signal S2 to generate an optical transmission signal S3 consisting of infrared rays.

The optical transmission signal S3 is converted to a modulated audio signal S4 by an infrared photodetector 5 comprising an optical filter, a lens, a photodiode (or a phototransistor), and an amplifying circuit and inputted to a receiver 6. The receiver 6 generates a demodulated audio signal S5 having the same data structure as the digital audio signal S1 by reversing the processing performed by the transmitter 3 and demodulating the modulated audio signal S4 and transmits the demodulated audio signal 5 to an analog audio unit 7 and/or a digital audio unit 8 comprising a speaker system and the like through a coaxial cable or optical fiber.

Figure 3:
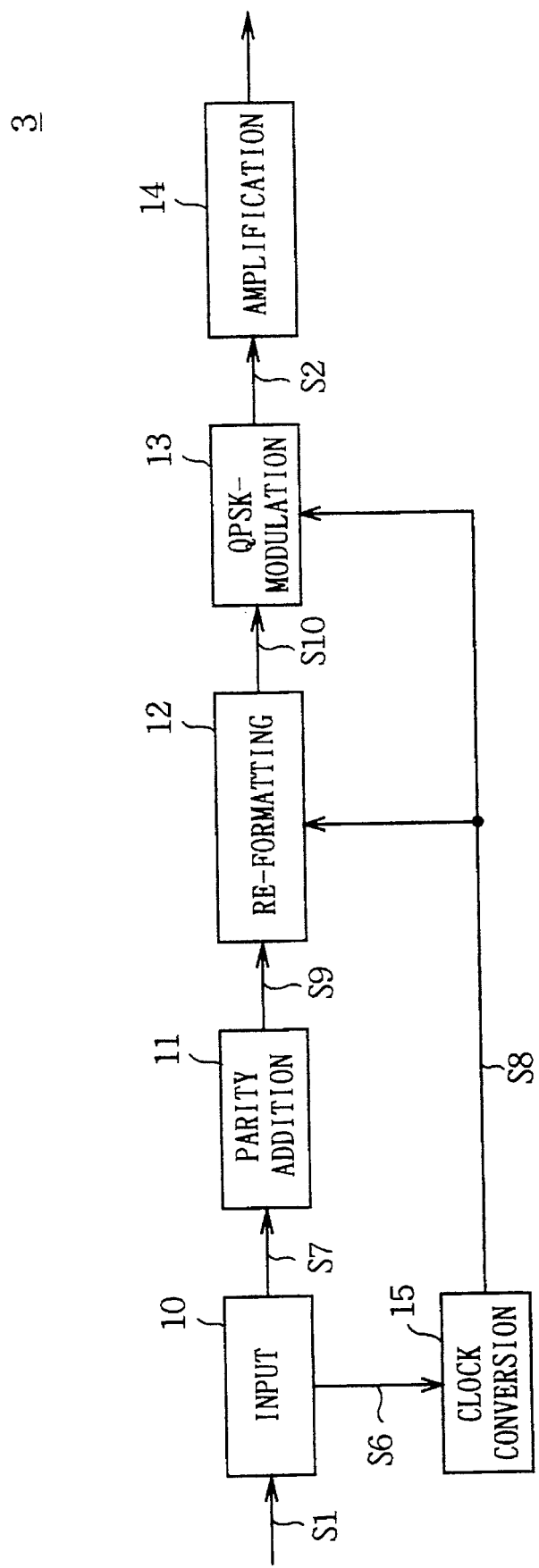
FIG. 3 is a block diagram showing the structure of a transmitter of the embodiment.

In this case, the transmitter 3 is constituted as shown in FIG. 3. That is, the transmitter 3 inputs the digital audio signal S1 to a re-formatting circuit 12 through an input circuit 10 and a parity addition circuit 11. The parity addition circuit 11 adds an error correction parity to a digital audio signal S7 and supplies a digital audio signal S9 obtained as the result of addition of the parity to the re-formatting circuit 12.

Figure 4A:
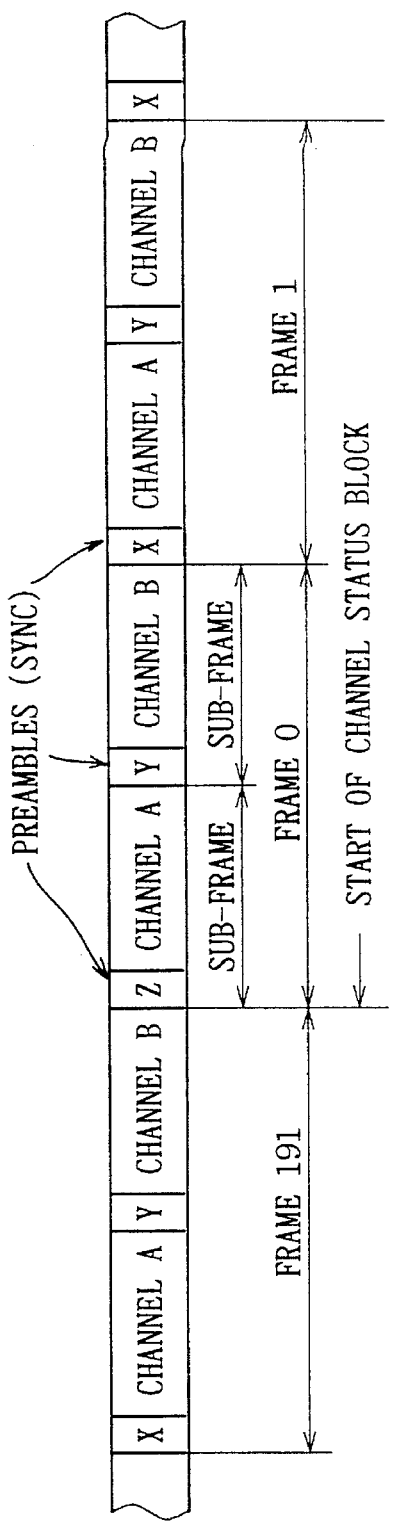
FIGS. 4(A) and 4(B) are schematic diagrams showing data block structures of the DIO standard.
Figure 4B:
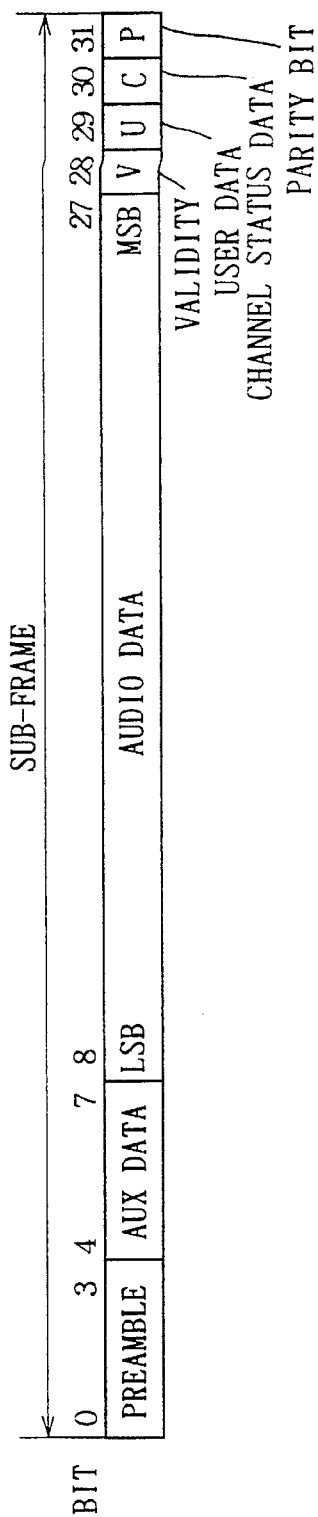

The re-formatting circuit 12 removes unnecessary data or duplicate data such as a block synchronizing signal or subframe synchronizing signal from the digital audio signal S9 and thereafter stores the block structure specified in IEC-958 (DIO), and moreover, when necessary, forms a predetermined bit stream by adding an error correction parity to the signal S9. As a result, the re-formatting circuit 12 makes it possible to narrow the bandwidth of the digital audio signal S9 by removing unnecessary data and add error correction data to the digital audio signal S9. FIGS. 4A and 4B show the block structure specified in DIO.

The transmitter 3 supplies the digital audio signal S1 to a clock conversion circuit 15 through the input circuit 10. The clock conversion circuit 15 comprises a PLL circuit, a frequency dividing circuit, and a multiplication circuit and generates a channel clock S8 by properly converting a data clock (sampling frequency) S6 of the digital audio signal S1 in accordance with the information on how much data increases (predetermined) in the parity addition circuit 11 and the re-formatting circuit 12.

In fact, the digital audio signal S1 is a signal reproduced by the digital audio unit 2 (FIG. 2) such as a digital processor, compact-disk reproducer, or digital audio taperecorder (DAT), with a sampling frequency of 32, 44.056, 44.1, or 48 kHz, and at a transmission rate of 3.072 Mbps when the number of quantization bits ranges between 20 and 24 and a sampling frequency of 48 kHz (this is the severest condition for limiting the frequency band of a signal), that is, a digital audio signal conforming to IEC-958 specified by IEC (International Electrotechnical Commission).

A QPSK (Quadrature Phase Shift Keying) modulation circuit 13 receives a re-formatted signal S10 outputted from the re-formatting circuit 12 and the channel clock S8 obtained by clock-converting the sampling frequency signal S6. The QPSK modulation circuit 13 sets the re-formatted signal S10 within a predetermined frequency range by applying four-phase modulation to the re-formatted signal S10 while referring to the channel clock S8.

Figure 5:
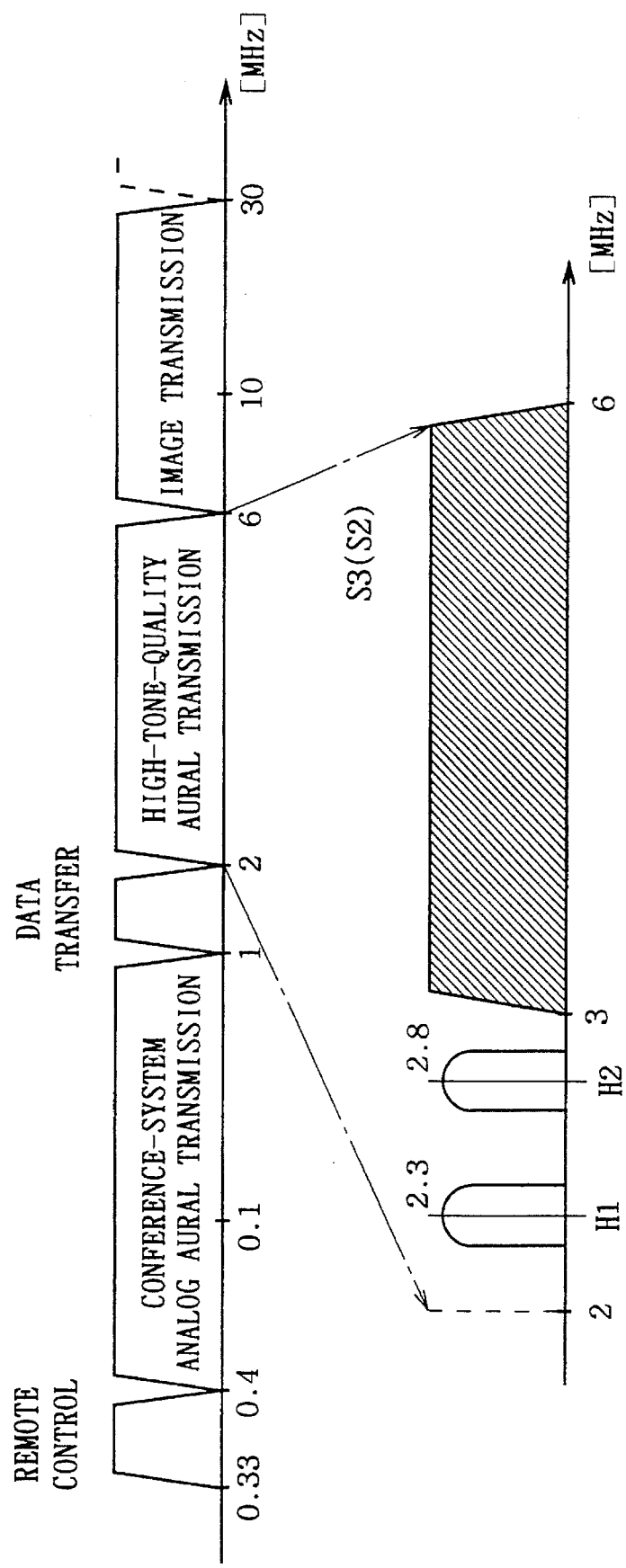
FIG. 5 is a schematic diagram showing a frequency band of an optical transmission signal outputted from the audio signal transmission apparatus of the embodiment.

Thus, the QPSK modulation circuit 13 modulates the digital audio signal S1 into the modulated audio signal S2 with a frequency band of 3 to 6 MHz by avoiding the frequencies 2.3 and 2.8 MHz allocated to an analog headphone out of the frequencies of 2 to 6 MHz assigned as a high-tone-quality voice transmission band, as shown in FIG. 5.

Figure 6:
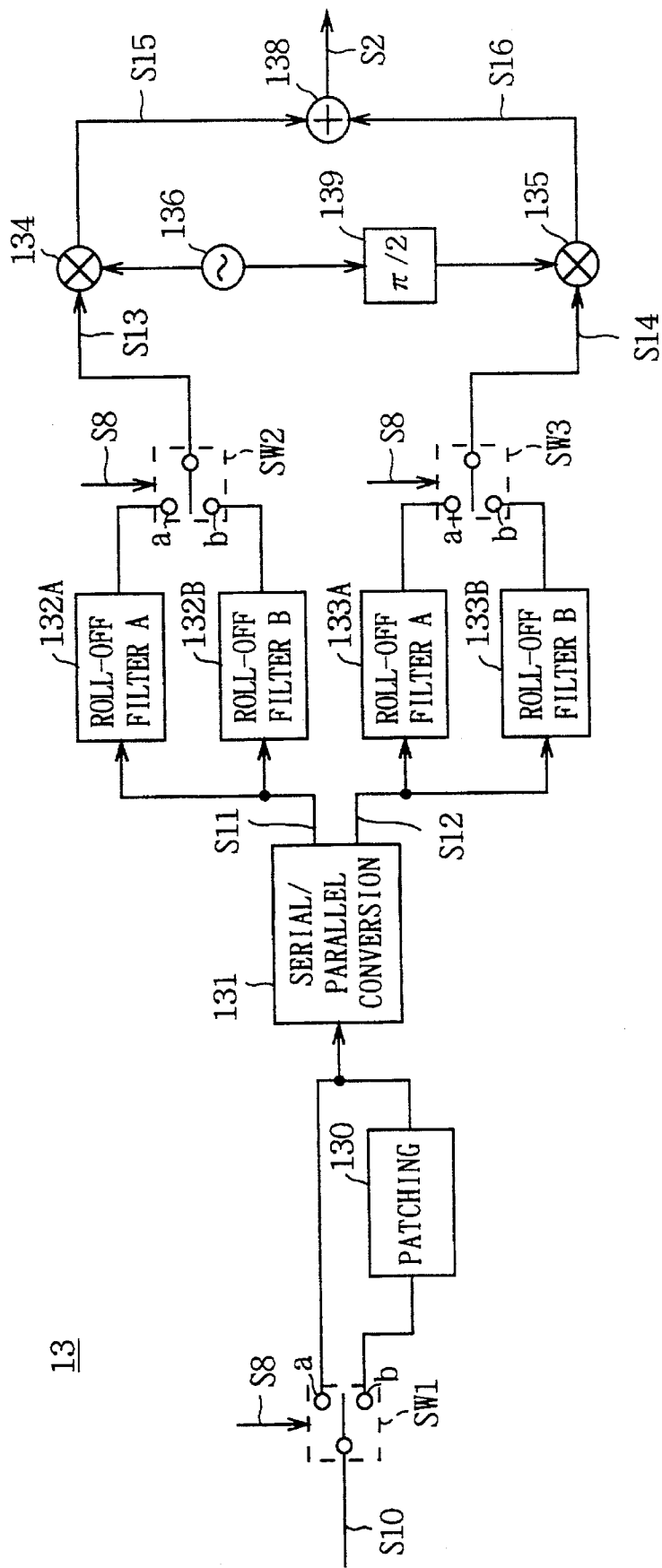
FIG. 6 is a block diagram showing the structure of a QPSK modulation circuit of the embodiment.

FIG. 6 shows a detailed structure of the QPSK modulation circuit 13. The re-formatted signal S10 is supplied to the input terminal of a switcher SW1. In the switcher SW1, either terminal "a" or "b" is selected in accordance with the channel clock S8. That is, the terminal "a" is selected when the channel clock S8 corresponds to the sampling frequency 44.056 or 44.1 kHz and the terminal "b" is selected when it corresponds to the sampling frequency 32 or 48 kHz.

In this case, the switcher SW1 is controlled in accordance with the channel clock S8. However, it is also possible to control the switcher SW1 by using the data clock S6 because it is possible to know the sampling frequency of the digital audio signal S1 by using either channel clock S8 or data clock S6. Therefore, as long as the sampling frequency can be known, it is possible to switch the terminals "a" and "b" of the switcher SW1 by using any signal specified in IEC-958 (DIO) and capable of discriminating the sampling frequency.

Thereby, when the sampling frequency is 44.056 or 44.1 kHz, the re-formatted signal S10 is directly inputted to a serial/parallel conversion circuit 131. However, when the sampling frequency is 32 or 48 kHz, the signal S10 is inputted to the serial/parallel conversion circuit 131 through a patching circuit 130. The patching circuit 130 reads data at a channel clock corresponding to the sampling frequency of 48 kHz and forms a data block even if the data of 32 kHz is inputted.

However, because the patching circuit 130 reads the data of 32 kHz at the channel clock of 48 kHz, the data overflows one block. Therefore, the patching circuit 130 performs patching for inserting unnecessary data. In this case, ⅓ the data in the block becomes unnecessary data. Thus, because patching is performed, the signal of 32 kHz can be handled as the signal of 48 kHz and processed by a pair of roll-off filters. As a result, the structure can be simplified.

The re-formatted signal S10 is parallel-converted to I-data S11 and Q-data S12 by the serial/parallel conversion circuit 131. The I-data S11 and Q-data S12 are supplied to roll-off filters 132 and 133 respectively. In this case, roll-off filters 132A and 133A perform filtering to the signals with the sampling frequencies of 44.056 and 44.1 kHz by regarding them as signals corresponding to one sampling frequency. This is because the sampling frequencies of these two signals are very close to each other.

Moreover, roll-off filters 132B and 133B perform filtering corresponding to the signal of 48 kHz . These two types of filters are switched by switchers SW2 and SW3 similarly to the case of the switcher SW1. Filtered I-data S13 and Q-data S14 are supplied to multiplication circuits 134 and 135 respectively.

The multiplication circuit 134 multiplies a carrier fc generated by a carrier generation circuit 136 by the I-data S13 and sends a modulated signal S15 obtained as the result of the multiplication to an addition circuit 138. The multiplication circuit 135 multiplies the carrier fc whose phase is shifted by $\pi/2$ by a phase shifter 139 by the Q-data S14 and sends a modulated signal S16 obtained as the result of the multiplication to the addition circuit 138. Thus, the modulated signals S15 and S16 are added by the addition circuit 138 and thereby, the modulated audio signal S2 generated by QPSK-modulating the carrier fc with the digital audio signal (re-formatted signal) S10 is obtained.

In the case of this embodiment, roll-off rates of two pairs of roll-off filters 132 and 133 are set to 20 to 30% and resultingly, the QPSK modulation circuits 13 can obtain a transmission content capable of adding an error correction parity.

The modulated audio signal S2 outputted from the QPSK modulation circuit 13 is transmitted to the following infrared optical emitter 4 (FIG. 2) through the amplification circuit 14. Thus, it is possible to output the optical transmission signal S3 set within a specified frequency band from the infrared optical emitter 4.

Figure 7A:
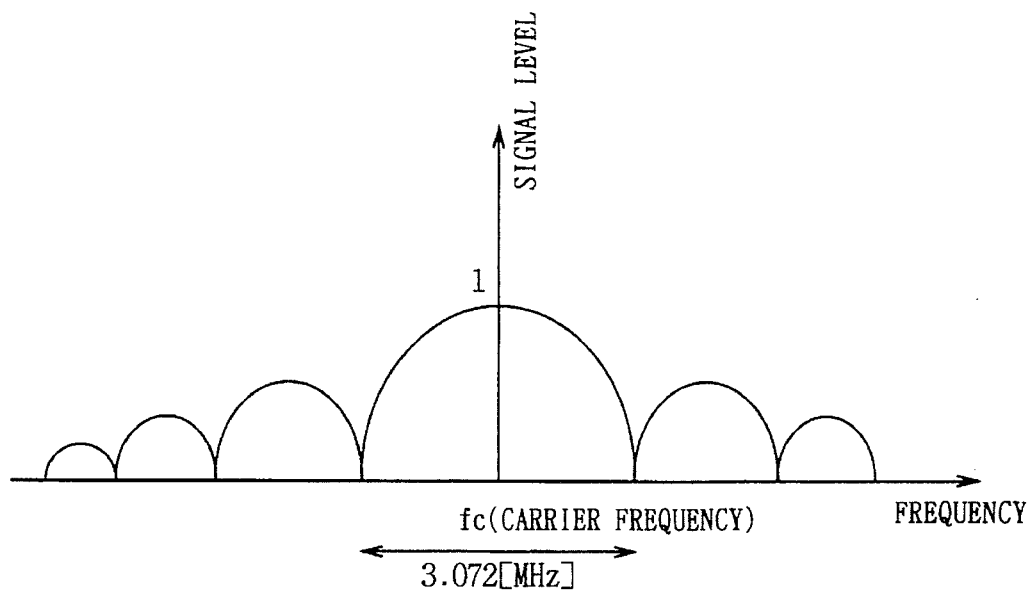
FIGS. 7(A) to 7(C) are schematic diagrams explaining the roll-off filtering by the embodiment.

Therefore, the transmitter 3 effectively sets a digital audio signal within a specified frequency by combining the filtering by the roll-off filters 132 and 133 having a roll-off rate of 20 to 30% with QPSK modulation. This operation is described below by referring to FIGS. 7(A) to 7(C). FIG. 7(A) shows a signal obtained by modulating the signal of the sampling frequency of 48 kHz only by QPSK. In this case, the band has 3.072 MHz centering around the carrier frequency fc (e.g. 4.5 kHz ). Therefore, it is not impossible to set a digital audio signal within 3 to 6 MHz only by QPSK modulation.

Figure 7B:
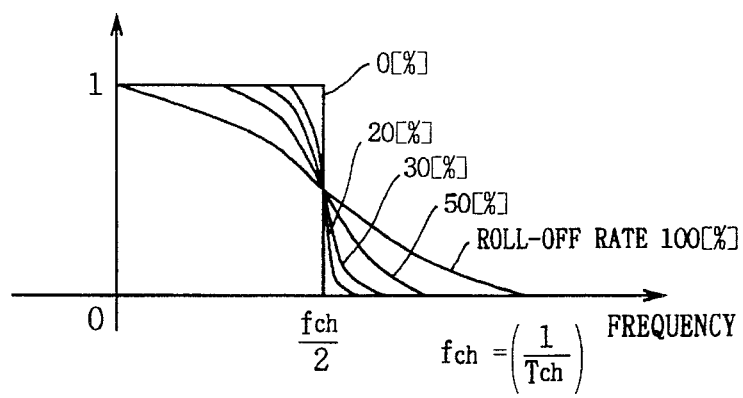

Therefore, the transmitter 3 further narrows the bandwidth by combining roll-off filtering with QPSK modulation. FIG. 7(B) shows characteristic curves of a roll-off filter. To set a digital audio signal within 3 to 6 MHz and add a predetermined number of error correction codes to the signal, it is necessary to decrease a roll-off rate. However, because it is practically difficult to realize an extremely-steep characteristic curve, it is proper to set the roll-off rate to 20 to 30%. Therefore, in the case of this embodiment, the roll-off rate is set to 20 to 30%. In FIG. 7(B), symbol fch represents a channel clock frequency on a transmission path and Tch represents a time interval of a symbol.

Figure 7C:
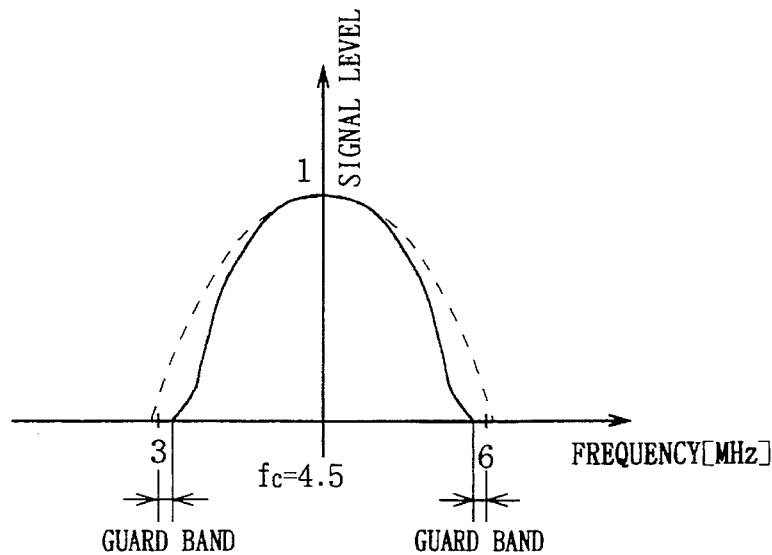

FIG. 7(C) shows a digital audio signal whose frequency is set within 3 to 6 MHz by combining roll-off filtering with QPSK modulation as the case of this embodiment. The both ends of the signal are provided with a slight allowance (guard band) respectively because a case of performing processing with a band pass filter (not shown) at the receiving side is considered.

Figure 8:
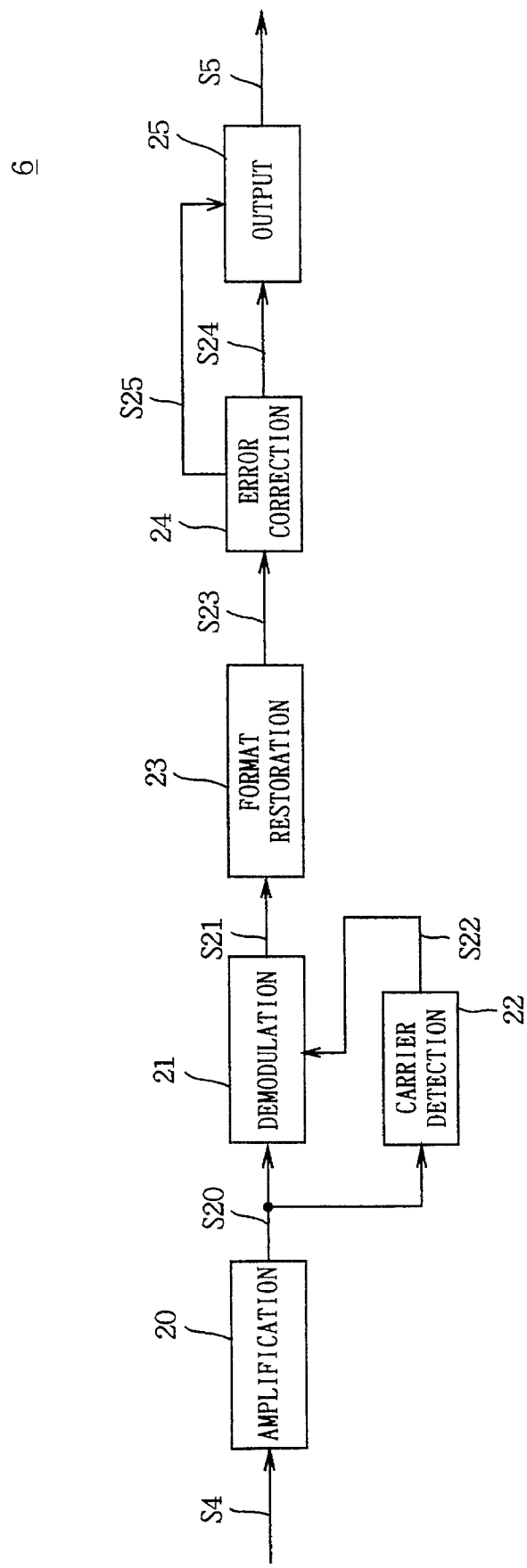
FIG. 8 is a block diagram showing the structure of a receiver of the embodiment.

In this case, the receiver 6 is constituted as shown in FIG. 8. That is, the receiver 6 inputs the modulated audio signal S4 outputted from the infrared photodetector 5 to a QPSK demodulation circuit 21 and a carrier detection circuit 22 through an amplification circuit 20. The QPSK demodulation circuit 21 generates a demodulated audio signal S21 comprising the same bit stream as the re-formatted signal S10 (FIG. 3) by demodulating a modulated audio signal S20 while referring to a carrier signal S22 detected by the carrier detection circuit 22 and sends the demodulated audio signal S21 to a format restoration circuit 23.

The format restoration circuit 223 generates a digital audio signal S23 conforming to IEC-958 from the demodulated audio signal S21 by reversing the processing performed by the reformatting circuit 12 and sends the digital audio signal S23 to an error correction circuit 24. The error correction circuit 24 corrects an error caused under transmission by using an error correction parity included in the digital audio signal S23 and sends a digital audio signal S24 obtained as the result of the error correction to an output circuit 225.

In this case, the error correction circuit 224 checks if the error can be corrected. If not, the circuit 24 sends an output control signal S25 to the output circuit 25 to stop the output operation of the output circuit 25. In the case of this embodiment, the error correction parity uses a Read-Solomon code, a correctable range "r" is set as shown in the following equation:

$$d>2r \tag{1}$$

for a distance "d" of a correction code in order to enable error correction, and errors are corrected in the range. The output circuit 25 generates the demodulated audio signal S5 by converting the data rate of the digital audio signal S24 to a value suitable for an audio unit at the rear stage and outputs the signal S5.

In the above structure, the transmitter 3 of this embodiment sets a signal of, for example, 3.072 Mbps within a frequency band of 3 to 6 MHz . The transmitter 3 removes unnecessary data from an inputted digital audio signal. Moreover, the transmitter 3 adds an error correction parity to data. In this case, data content of the signal increases by a value obtained by subtracting unnecessary data from the parity compared to that of the original signal.

Then, the transmitter 3 applies QPSK modulation to the above data. When applying the QPSK modulation, the transmitter 3 applies roll-off filtering to the digital audio signal at a roll-off rate of 20 to 30%. As a result, when the roll-off rate is set to 30%, it is possible to form a modulated audio signal having a bandwidth of approximately 2.0 to 2.6 MHz centering around the carrier frequency fc (=4.5 MHz ). This bandwidth slightly changes depending on the parity content.

Therefore, the above structure makes it possible to set the digital audio signal S1 conforming to IEC-958 within a frequency band conforming to an infrared transmission standard by applying roll-off filtering and QPSK modulation to the signal S1. Thus, the infrared transmission apparatus 1 makes it possible to obtain the optical transmission signal S3 conforming to an infrared transmission standard by driving an infrared emitter 4 based on the modulated audio signal S2 obtained as the result of the above operations.

Moreover, it is possible to simplify the structure by processing the digital audio signal S1 comprising four types of sampling frequencies by two roll-off filters.

Furthermore, it is possible to add an error correction code to a predetermined transmission content by setting the roll-off rate of each roll-off filter to 20 to 30%.

(2) Second Embodiment

Figure 9:
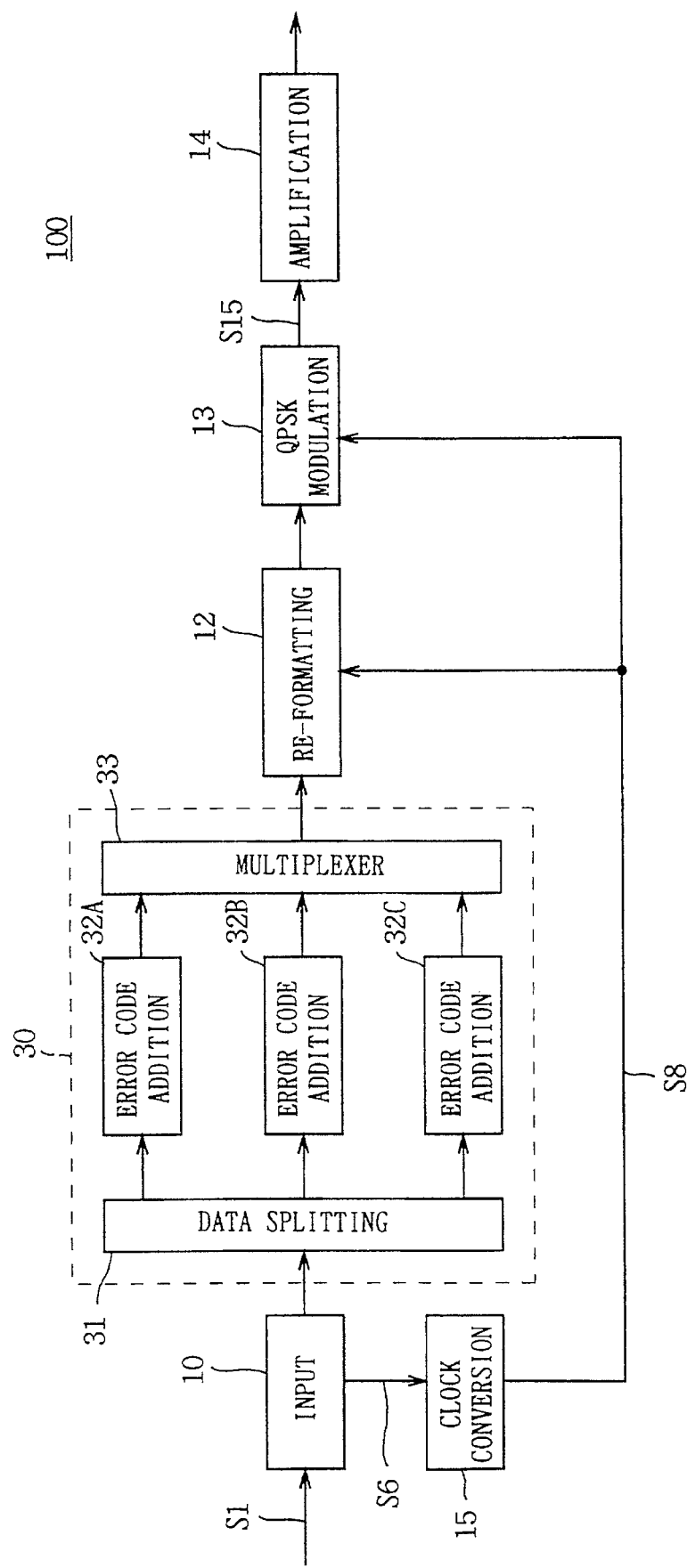
FIG. 9 is a block diagram showing the structure of a transmitter of the second embodiment.

FIG. 9 shows a transmitter 100 which is another embodiment of the transmitter 3 of FIG. 2. Those portions of FIG. 9 which correspond to elements of FIG. 3 utilize the same reference number. In transmitter 100, the inputted digital audio signal S1 to a data branching circuit 31 of a parity addition circuit 30 through the input circuit 10. The data branching circuit 31 sends the most significant data to an error code addition circuit 32A, the next most significant data to an error code addition circuit 32B, and least significant data to an error code addition circuit 32C in accordance with the significance (specified by DIO format) of the data included in the digital audio signal S1.

The error code addition circuit 32A adds the most error correction parities to the inputted data, the error code addition circuit 32C adds the least error correction parities to the data, and the inputted error code addition circuit 32B adds error correction parities less than those of the error code addition circuit 32A but more than those of the error code addition circuit 32C to the data.

The data outputted from the error code addition circuits 32A to 32C is inputted to the re-formatting circuit 12 through a multiplexer 33. The data re-formatted by the re-formatting circuit 12 as described above is sent to the QPSK modulation circuit 13, set within a frequency band conforming to an infrared transmission standard by being modulated by the circuit 13, and outputted as the modulated audio signal S15.

Because the data values in user's bit, valid bit, and channel status bit (see FIG. 4B) among the data included in the digital audio signal S1 conforming to IEC-958 are practically very important, the data branching circuit 31 sends these data values to the error code addition circuit 32A. Moreover, because the significance of audio data decreases from the MSB (Most Significant Bit) to the LSB (Least Significant Bit), the audio data is distributed such that error code addition circuit 32A receives the MSB and error code addition circuit 32C receives the LSB.

As a result, data provided with more error correction parities as more easily restored at the receiving side when the same bit error occurs under transmission because that data has higher correction capacity than other data. However, data provided with less error correction parities is less easily restored because the data has lower restoration capacity. In other words, the transmitter 100 applies weighting to the data included in the digital audio signal S1.

Therefore, the transmitter 100 realizes the graceful degradation by using the weighting. That is, when driving the infrared optical emitter 4 based on the modulated audio signal S15 generated by the transmitter 100 of this embodiment, the tone quality is deteriorates starting with data having less error correction parities at the receiving side as the distance between the transmitting side and the receiving side increases. As a result, the transmitter 100 makes it possible to obtain an effect as if the tone quality of an analog audio signal slowly deteriorates instead of the fact that all voices are suddenly interrupted when the distance between the transmitter 100 and the receiver 6 exceeds a certain value and therefore supply more natural voices to the receiving side.

Moreover, the transmitter 100 makes it possible to freely adjust a transmission distance in accordance with the purpose by previously setting the number of error correction parities to be added to a desired value and thereby, the usability can be improved.

In the above structure, the transmitter 100 splits data in accordance with the significance of the data included in the digital audio signal S1. Then, the transmitter 100 adds more error correction parities to data with higher significance and less error correction parities to data with lower significance.

Then, the data along with the error correction parities is QPSK-modulated and the modulated audio signal S15 obtained as the result of the QPSK modulation is supplied to the infrared optical emitter 4 (FIG. 2) to obtain the optical transmission signal S3.

Figure 10:
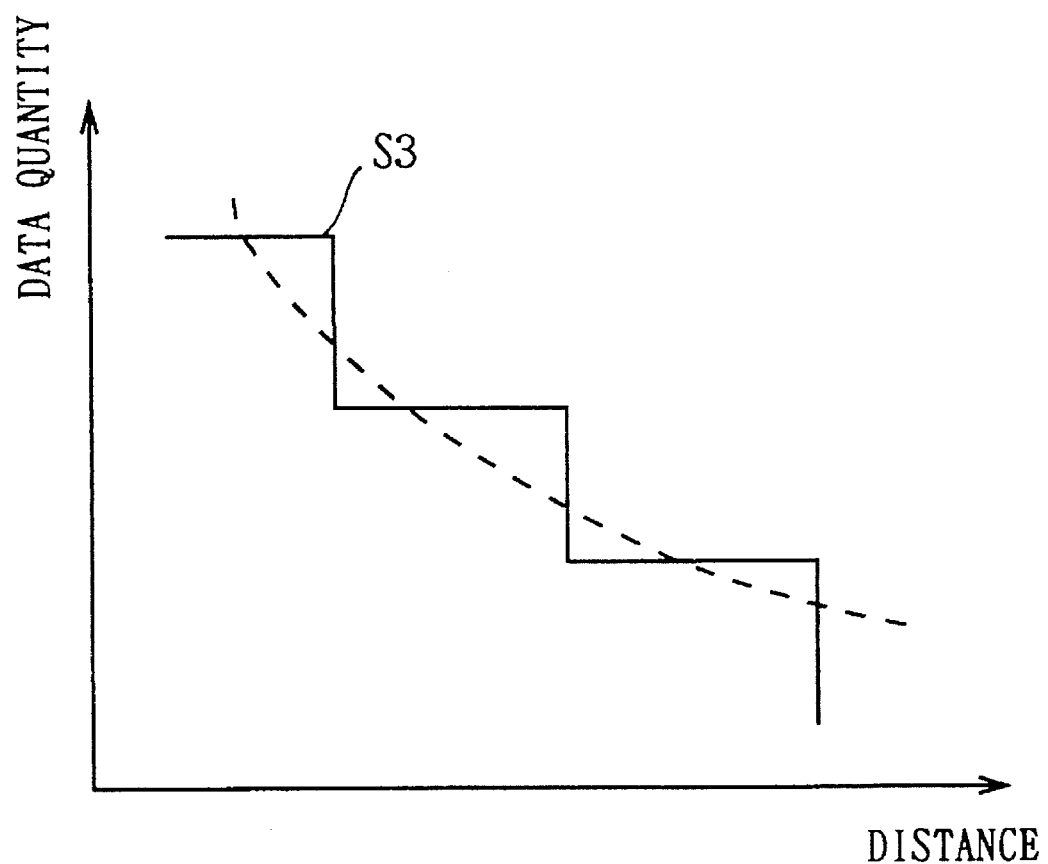
FIG. 10 is a characteristic curvilinear diagram showing the relation between distance up to a receiver explaining graceful degradation and reached data.

The data quantity of the optical transmission signal S3 thus obtained reaching a receiver decreases stepwise as the distance from the receiver increases as shown in FIG. 10. Therefore, it is possible to receive natural sounds similar to the case of analog transmission, shown by a broken line in FIG. 10, at the receiving side.

According to the above structure, it is possible to realize graceful degradation and comparatively improve the tone quality at the receiving side because more error correction parities are added to data with higher significance and thereafter QPSK-modulated.

(3) Other Embodiments (3-1) In the above second embodiment, graceful degradation is realized by splitting the data included in the digital audio signal S1 in accordance with significance and adding more error correction parities to data with higher significance. However, the present invention is not only limited to this, but it is also possible to realize graceful degradation through multi-carrier transmission by using, for example, a transmitter 200 with the structure shown in FIG. 11 as part of the transmitter 3 (FIG. 2).

Figure 11:
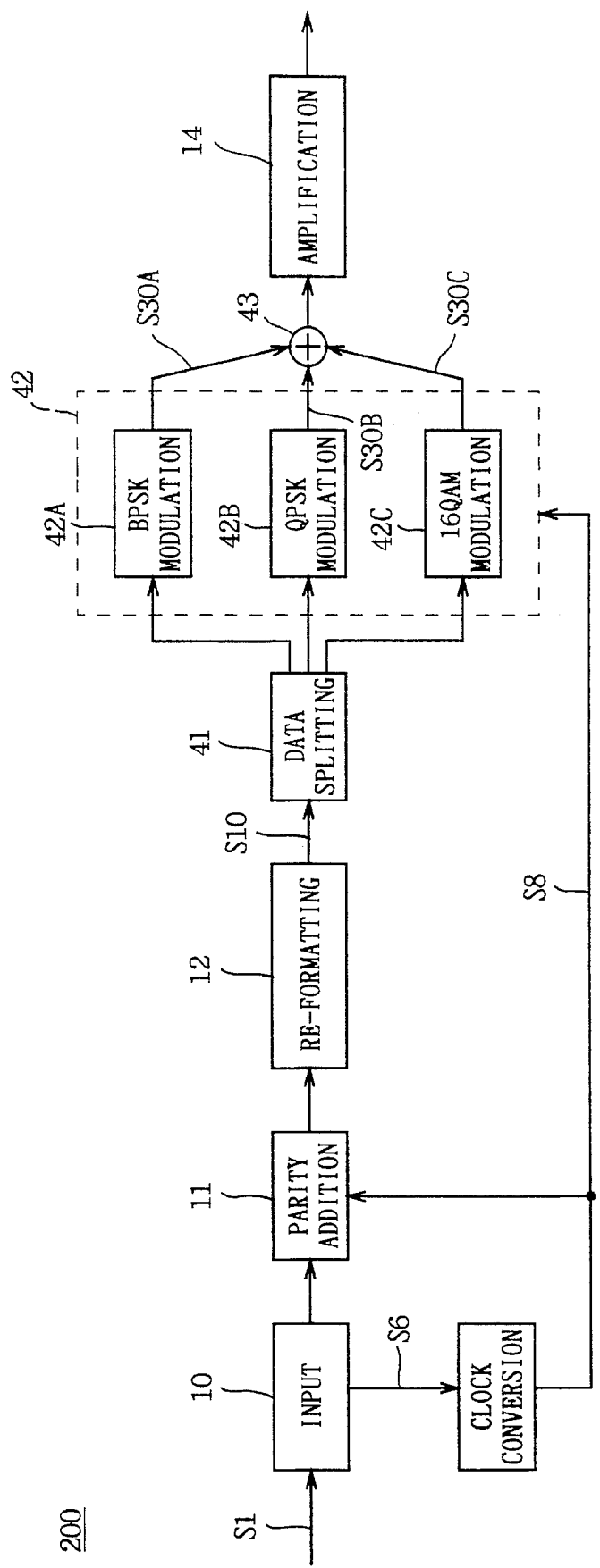
FIG. 11 is a block diagram showing the structure of a receiver of another embodiment.

In FIG. 11, in which those portions corresponding to portions of FIG. 3 are provided with the same reference numeral, the transmitter 200 divides the re-formatted signal S10 outputted from the re-formatting circuit 12 into a plurality of data values in accordance with the significance of the data. Each divided data value is modulated by a different modulation method by a digital modulation section 42 and set within a specified frequency band. In this case, it is possible to constitute the modulation section 42 with a BPSK (Binary Phase Shift Keying) modulation circuit 42A, a QPSK modulation circuit 42B, and a 16QAM (Quadrature Amplitude Modulation) circuit 42C. Moreover, the modulation circuits 42A to 42C are constituted so as to shape waveforms by a roll-off filter similarly to the case of the above embodiments.

In this case, the rate of the data quantity of each modulation method is determined in accordance with the following idea. That is, when transmitting a digital audio signal only through QPSK modulation, specifying the bandwidth in the QPSK modulation as "1" and the transmission data quantity as "1", and assuming the data rates of the BPSK modulation, QPSK modulation, and 16QAM modulation as "x", "y", and "z" respectively, the following equation:

$$x+y+z=1 \qquad (2)$$

is obtained for the data quantity. Moreover, the following equation:

$$2x+y+z/2=1 \qquad (3)$$

is obtained for the bandwidth. Therefore, the rate of data quantity of each modulation method can be obtained from the above two equations. To transmit the same data quantity as the QPSK modulation, the BPSK modulation requires a twofold band but the 16QAM modulation requires only a ½ band. Therefore, the equation (3) is obtained for the bandwidth.

Modulated signals S30A to S30C outputted from the digital modulation circuits 42A to 42C, respectively, are supplied to an infrared optical emitter through the addition circuit 43 and the amplification circuit 14. Thus, graceful degradation can be realized because the data transmission distance is different for each modulation method.

(3-2) In the above embodiments, the roll-off filters 132 and 133 (FIG. 6) are placed at the output stage of the serial/parallel conversion circuit 131 and at the input stage of phase modulation by the carriers so that the QPSK modulation circuit 13 is easily realized. However, the present invention is not only limited to this, but it is also possible to place the roll-off filters 132 and 133 at the output stage of the phase modulation.

Moreover, in the above embodiments, a roll-off filter with a roll-off rate of 20 to 30% is included in the QPSK modulation circuit 13 of the transmitter 3. However, the present invention is not only limited to this, but it is also possible to place a roll-off filter on both the modulation side and the demodulation side. In this case, it is necessary to constitute the roll-off filters so that the roll-off rates of the modulation-side and demodulation-side roll-off filters come to a total of 20 to 30%. That is, it is necessary to realize roll-off in the whole transmission path. It is normally necessary to use a filter having the root roll-off characteristic equally distributed to the transmitting side (modulation side) and the receiving side (demodulation side).

(3—3) In the above embodiments, the digital audio signal S1 conforming to IEC-958 is set within a specified frequency band and infrared-transmitted. However, the present invention is not only limited to this, but can apply to the case of infrared-transmitting Atrac data obtained from a minidisk drive (MD), data obtained from a digital compact cassette (DCC), or computer data and obtain the same advantages as with the above embodiments. Moreover, these types of data can be discriminated by adding a header to them.

(3-4) By adding a return function to the receiving side, it is possible to control the light emitting direction or the like at the transmitting side in accordance with the receiving state at the receiving side and further improve the usability.

Furthermore, according to the above embodiments, noise is decreased and the error rate is improved as the result of narrowing the frequency bandwidth of a transmission signal and, resultingly, the transmission distance can be increased for the same transmission output. It is also possible to obtain the same advantage by performing narrow-angle transmission by the infrared optical emitter 4. This is effective when the receiving side is a fixed object like a speaker.

(3-5) In the above embodiments, the digital audio unit 2 (FIG. 2) is provided separately from the transmitter 3 and the infrared optical emitter 4, and the analog audio unit 7 and the digital audio unit 8 are set separately from the infrared photodetector 5 and the receiver 6. However, the present invention is not only limited to this, but may provide the transmitter 3 and the infrared optical emitter 4 on the digital audio unit 2, and the infrared photodetector 5 and the receiver 6 on the analog audio unit 7 or digital audio unit 8.

As described above, according to the present invention, a digital signal transmission apparatus capable of infrared-transmitting a digital signal within a specified frequency band can be realized by using QPSK-modulation means provided with a means for generating an I-component signal and a Q-component signal through serial/parallel conversion, a roll-off filter with a predetermined roll-off rate for narrowing a bandwidth through filtering of the I-component signal and the Q-component signal, and a means for two-phase-modulating the filtered I- and Q-component signals, and driving an infrared emitter based on a digital modulated signal supplied from the QPSK-modulation means and thereby generating infrared rays.

Moreover, according to the present invention, a digital signal transmission apparatus capable of infrared-transmitting a digital signal within a specified frequency band and obtaining a desired signal characteristic at the receiving side can be realized by applying a different modulation to each data value included in the digital signal in accordance with a predetermined significance of the data value, using a plurality of modulation means having a roll-off filter respectively, and driving an infrared emitter based on the digital signal modulated by each modulation means.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A digital signal transmission apparatus, comprising:
   input means for receiving a digital signal at a predetermined transmission rate;
   QPSK-modulation means including a means for generating an I-component signal and a Q-component signal through serial/parallel conversion of the digital signal received by said input means, a roll-off filter with a predetermined roll-off rate for narrowing a bandwidth through filtering of the I-component signal and the Q-component signal, and a means for two-phase-modulating the filtered I- and Q-component signals; and
   infrared transmission means for transmitting said digital signal to external units by driving an infrared emitter based on a digital modulated signal supplied from said QPSK-modulation means and thereby generating infrared rays.

2. The digital signal transmission apparatus according to claim 1, wherein:
   said roll-off rate of said roll-off filter is approximately 20 to 30%.

3. The digital signal transmission apparatus according to claim 1, wherein:
   said digital signal comprises a signal with a sampling frequency that includes one of 32, 44.056, 44.1, and 48 kHz; and
   said QPSK-modulation means sets said digital signal within a frequency band of 3 to 6 MHz.

4. The digital signal transmission apparatus according to claim 1, wherein:

said digital signal comprises data sampled with a sampling frequency that includes one of 32, 44.056, 44.1, and 48 kHz; and said QPSK-modulation means sets said received digital signal within a frequency band of 3 to 6 MHz.

5. A digital signal transmission apparatus, comprising:

input means for receiving a digital signal at a predetermined transmission rate, wherein said digital signal comprises at least one from a set of signals comprising a first signal having a first sampling frequency and a second signal having a second sampling frequency wherein a ratio of the first and second sampling frequencies is m:n, where m>n, and where m and n are positive integers;

QPSK-modulation means including a means for generating an I-component signal and a Q-component signal through serial/parallel conversion of the digital signal received by said input means, a roll-off filter with a predetermined roll-off rate for narrowing a bandwidth through filtering of the I-component signal and the Q-component signal, and a means for two-phase-modulating the filtered I- and Q-component signals, wherein said QPSK-modulation means is provided with patching means for patching said second signal to process it as said first signal; and infrared transmission means for transmitting said digital signal to external units by driving an infrared emitter based on a digital modulated signal supplied from said QPSK-modulation means and thereby generating infrared rays.

6. The digital signal transmission apparatus according to claim 5, wherein:

said set of signals further comprises a third signal having a third sampling frequency and a fourth signal having a fourth sampling frequency wherein the third and fourth sampling frequencies are close to each other;

said roll-off filter comprises a first roll-off filter for roll-off-shaping said first signal and a second roll-off filter for roll-off-shaping said third and fourth signals as one sampling frequency; and switching means for selecting one of an output of said first roll-off filter and an output of said second roll-off filter and supplying the selected output to said two-phase-modulating means.

7. The digital signal transmission apparatus according to claim 6, wherein:

said first, second, third, and fourth sampling frequencies are 32, 48, 44.056, and 44.1 kHz, respectively.

8. A digital signal transmission apparatus, comprising:

input means for receiving a digital signal at a predetermined transmission rate;

QPSK-modulation means including a means for generating an I-component signal and a Q-component signal through serial/parallel conversion of the digital signal received by said input means, a roll-off filter with a predetermined roll-off rate for narrowing a bandwidth through filtering of the I-component signal and the Q-component signal, and a means for two-phase-modulating the filtered I- and Q-component signals;

error-correction-code addition means for adding an error correction code to said digital signal received by the input means and supplying the digital signal provided with the error correction code to said QPSK-modulation means; and infrared transmission means for transmitting said digital signal to external units by driving an infrared emitter based on a digital modulated signal supplied from said QPSK-modulation means and thereby generating infrared rays.

9. The digital signal transmission apparatus according to claim 8, wherein said error-correction-code addition means comprises:

data division means for dividing said digital signal into a plurality of data values in accordance With a predetermined significance of each one of the plurality of data values included in said digital signal;

a plurality of error-correction-code means for adding a different error correction code to each one of the plurality of data values; and addition means for adding said plurality of data values provided with different error correction codes.

10. A digital signal transmission apparatus, comprising:

input means for receiving a digital signal at a predetermined transmission rate;

data division means for dividing said digital signal into a plurality of data values in accordance with a predetermined significance of each one of said plurality of data values included in said digital signal;

BPSK-modulation means for roll-off-shaping and BPSK-modulating at least one of said plurality of data values;

QPSK-modulation means including a means for generating an I-component signal and a Q-component signal through serial/parallel conversion of at least one of said plurality of data values, a roll-off filter with a predetermined roll-off rate for narrowing a bandwidth through filtering of the I-component signal and the Q-component signal, and a means for two-phase-modulating the filtered I-component and Q-Component signals;

16QAM-modulation means for roll-off-shaping and 16QAM-modulating at least one of said plurality of data values; and addition means for adding said BPSK-modulated data, said 16QAM-modulated data, and said QPSK-modulated data; and infrared transmission means for transmitting said digital signal to external units by driving an infrared emitter and thereby generating infrared rays, wherein said infrared transmission means generates said infrared rays by driving said infrared emitter based on a digital modulated signal supplied from said addition means and transmits said digital signal to external units.

11. A digital signal transmission method, comprising the steps of:

receiving a digital signal at a predetermined transmission rate;

the received digital signal, roll-off filtering the I-component signal and the Q-component signal to narrow a bandwidth, and two-phase-modulating the roll-off filtered I- and Q-component signals; and transmitting said received digital signal to external units by driving an infrared emitter based on the QPSK-modulated received digital signal thereby generating infrared rays.

12. The digital signal transmission method according to claim 11, wherein:

a roll-off rate of said roll-off filtering used on said QPSK-modulation step is approximately 20 to 30%.

13. The digital signal transmission method according to claim 11, wherein:

said digital signal comprises data sampled with a sampling frequency that includes one of 32, 44.056, 44.1, and 48 kHz; and in said step of QPSK-modulating, said QPSK-modulated received digital signal is set within a frequency band of 3 to 6 MHz.

14. The digital signal transmission apparatus according to claim 24, wherein:

said digital signal comprises data sampled with a sampling frequency that includes one of 32, 44.056, 44.1, and 48 kHz; and in said QPSK-modulation step, said QPSK-modulated received digital signal is set within a frequency band of 3 to 6 MHz.

15. A digital signal transmission method, comprising the steps of:

receiving a digital signal at a predetermined transmission rate, wherein said digital signal comprises at least one from a set of signals comprising a first signal having a first sampling frequency and a second signal having a second sampling frequency, wherein a ratio of the first and second sampling frequencies is m:n, where m>n, and where m and n are positive integers;

QPSK-modulating the received digital signal by generating an I-component signal and a Q-component signal through serial/parallel conversion of the received digital signal, performing roll-off filtering on the I-component signal and the Q-component signal to narrow a bandwidth, and two-phase-modulating the roll-off filtered I- and Q-component signals, wherein said second signal is patched to process it as said first signal; and infrared transmitting said digital signal to external units by driving an infrared emitter based on a digital modulated signal produced by said QPSK modulating and thereby generating infrared rays.

16. The digital signal transmission method according to claim 15 wherein:

said set of signals further comprises a third signal having a third sampling frequency and a fourth signal having a fourth sampling frequency, wherein the third and fourth sampling frequencies are close to each other;

said QPSK modulating includes roll-off-shaping said first signal and roll-off-shaping said third and fourth signals as one sampling frequency; and further comprising the steps of:

selecting for said two-phase-modulation one of a processing result obtained by said roll-off shaping of the first signal and a processing result obtained by said roll-off shaping of the second signal.

17. The digital signal transmission method according to claim 16 wherein:

said first, second, third, and fourth sampling frequencies are 32, 48, 44.056, and 44.1 kHz, respectively.

18. A digital signal transmission method, comprising the steps of:

receiving a digital signal at a predetermined transmission rate;

QPSK modulating the received digital signal by generating an I-component signal and a Q-component signal through serial/parallel conversion of the received digital signal, roll-off filtering the I-component signal and the Q-component signal to narrow a bandwidth, and two-phase-modulating the roll-off filtered I- and Q-component signals;

adding an error correction code to said digital signal received by the input means and supplying the received digital signal provided with the error correction code to said step of QPSK modulating; and transmitting said digital signal to external units by driving an infrared emitter based on the QPSK-modulated received digital signal thereby generating infrared rays.

19. The digital signal transmission method according to claim 18, wherein said error-correction-code addition step further comprises the stepss of:

dividing said digital signal into a plurality of data values in accordance with a predetermined significance of each data value included in said digital signal;

adding a different error correction code to each divided data value; and adding said data values provided with different error correction codes.

20. A digital signal transmission method, comprising the steps of:

receiving a digital signal at a predetermined transmission rate;

dividing said digital signal into a plurality of data values in accordance with a predetermined significance of each one of said plurality of data values included in said digital signal;

roll-off-shaping and BPSK-modulating at least one of said plurality of data values;

QPSK modulating the at least one of said plurality of data values by generating an I-component signal and a Q-component signal through serial/parallel conversion of at least one of said plurality of data values, roll-off filtering the I-component signal and the Q-component signal to narrow a bandwidth, and two-phase-modulating the roll-off filtered I- and Q-component signals;

roll-off-shaping and 16QAM-modulating at least one of said plurality of data values; and adding said BPSK-modulated data, said 16QAM-modulated data, and said QPSK-modulated data;

transmitting said digital signal to external units by driving an infrared emitter thereby generating infrared rays, wherein said infrared rays are generated by driving said infrared emitter based on a digital modulated signal supplied from said step of adding, and said digital signal is transmitted to external units.

21. A digital signal transmitter-receiver, comprising:

QPSK-modulation means including a means for generating an I-component signal and a Q-component signal through serial/parallel conversion of a digital signal with a predetermined transmission rate, a roll-off filter with a predetermined roll-off rate for narrowing a bandwidth through filtering of the I-component signal and the Q-component signal, and a means for two-phase-modulating the filtered I- and Q-component signals;

infrared transmission means for transmitting said digital signal by driving an infrared emitter based on a digital modulated signal supplied from said QPSK-modulation means and thereby generating infrared rays;

infrared-ray receiving means for receiving the infrared rays transmitted from said infrared transmission means and forming a receiving signal corresponding to said digital modulated signal; and demodulation means for reproducing said digital signal by demodulating said receiving signal.

22. The digital signal transmitter-receiver according to claim 21, wherein:

said QPSK-modulation means and said infrared transmission means are arranged in a first electronic unit; and said infrared-ray receiving means and said demodulation means are arranged in a second electronic unit outside of the first electronic unit.

23. The digital signal transmitter-receiver according to claim 22, wherein said second electronic unit is a speaker system.

24. A digital signal transmission apparatus, comprising:

input means for receiving a digital signal at a predetermined transmission rate, wherein said digital signal comprises data sampled with one of first and second sampling frequencies, and wherein the first sampling frequency is greater than the second;

QPSK-modulation means including a means for generating an I-component signal and a Q-component signal through serial/parallel conversion of the digital signal received by said input means, a roll-off filter with a predetermined roll-off rate for narrowing a bandwidth through filtering of the I-component signal and the Q-component signal, and a means for two-phase-modulating the filtered I- and Q-component signals, wherein said QPSK-modulation means is provided with patching means for patching said data sampled with the second sampling frequency to process it as said data sampled with the first sampling frequency; and infrared transmission means for transmitting said digital signal to external units by driving an infrared emitter based on a digital modulated signal supplied from said QPSK-modulation means and thereby generating infrared rays.

25. The digital signal transmission apparatus according to claim 24, wherein:

said sampling frequency of said data of said digital signal is one of said first, said second, a third and a fourth sampling frequencies, wherein the third and fourth sampling frequencies are close to each other;

said roll-off filter comprises a first roll-off filter for roll-off-shaping said digital signal with data sampled with the first sampling frequency and a second roll-off filter for roll-off-shaping said digital signal with data sampled With one of the third and the fourth sampling frequencies as one sampling frequency; and further comprising:

switching means for selecting one of an output of said first roll-off filter and an output of said second roll-off filter and supplying the selected output to said two-phase-modulating means.

26. The digital signal transmission apparatus according to claim 25, wherein:

said first, second, third, and fourth sampling frequencies are 32, 48, 44.056, and 44.1 kHz, respectively.

27. A digital signal transmission method comprising the steps:

receiving a digital signal at a predetermined transmission rate, wherein said digital signal comprises data sampled with one of first and second sampling frequencies, and wherein the first sampling frequency is greater than the second;

QPSK-modulating the received digital signal to produce a digital modulated signal by generating an I-component signal and a Q-component signal through serial/parallel conversion of the received digital signal, performing roll-off filtering on the I-component signal and the Q-component signal to narrow a bandwidth, and two-phase-modulating the roll-off filtered I- and Q-component signals, wherein said data sampled with the second sampling frequency is patched to process it as said data sampled with the first sampling frequency; and infrared transmitting said digital signal to external units by driving an infrared emitter based on the digital modulated signal produced by said QPSK-modulating step and thereby generating infrared rays.

28. The digital signal transmission method according to claim 27, wherein:

said sampling frequency of said data of said digital signal is one of said first, said second, a third and a fourth sampling frequencies, wherein the third and fourth sampling frequencies are close to each other;

said QPSK-modulating step includes first roll-off filtering processing step of roll-off-shaping said digital signal with data sampled with the first sampling frequency, and second roll-off filtering processing step of roll-off-shaping said digital signal with data sampled with the third and the fourth sampling frequencies as one sampling frequency; and including a two-phase modulation step wherein one of a processing result obtained by said first roll-off filtering processing step and a processing result obtained by said second roll-off filtering processing step is selected, and the one processing result selected is two-phase-modulated.

29. The digital signal transmission method according to claim 28, wherein:

said first, second, third, and fourth sampling frequencies are 32, 48, 44.056, and 44.1 kHz, respectively.

* * * * *

UNITED STATES PATENT AND TRADEMARK OFFICE
CERTIFICATE OF CORRECTION

PATENT NO. : 5,602,669
DATED : February 11, 1997
INVENTOR(S) : YASUYUKI CHAKI

It is certified that error appears in the above-indentified patent and that said Letters Patent is hereby corrected as shown below:

In Col. 12, line 51, please insert, before "the received" the following:

--QPSK modulating the received digital signal by generating an I-component signal and a Q-component signal through serial/parallel conversion of--

In Col. 14, line 6, replace "stepss" with --steps--.

Signed and Sealed this

Twenty-seventh Day of May, 1997

Attest:

Attesting Officer

BRUCE LEHMAN

Commissioner of Patents and Trademarks